(12) United States Patent
Scharf-Bergmann et al.

(10) Patent No.: US 11,624,102 B2
(45) Date of Patent: Apr. 11, 2023

(54) METHOD AND DEVICE FOR PRODUCING FEEDSTOCK IN PIECE FORM FROM METAL

(71) Applicant: NORSK HYDRO ASA, Oslo (NO)

(72) Inventors: Roland Scharf-Bergmann, Grevenbroich (DE); Roar Orsund, Sunndalsora (NO)

(73) Assignee: Norsk Hydro ASA, Oslo (NO)

( * ) Notice: Subject to any disclaimer, the term of this patent is extended or adjusted under 35 U.S.C. 154(b) by 642 days.

(21) Appl. No.: 16/624,032

(22) PCT Filed: Apr. 5, 2018

(86) PCT No.: PCT/EP2018/058684
§ 371 (c)(1),
(2) Date: Dec. 18, 2019

(87) PCT Pub. No.: WO2018/233887
PCT Pub. Date: Dec. 27, 2018

(65) Prior Publication Data
US 2020/0216930 A1    Jul. 9, 2020

(30) Foreign Application Priority Data
Jun. 23, 2017   (DE) .................... 10 2017 114 012.3

(51) Int. Cl.
*C22B 21/00* (2006.01)
*C22B 9/16* (2006.01)
(Continued)

(52) U.S. Cl.
CPC .......... *C22B 21/0007* (2013.01); *B02C 23/08* (2013.01); *C22B 7/001* (2013.01); *C22B 9/16* (2013.01); *C22C 21/00* (2013.01)

(58) Field of Classification Search
CPC . B02C 23/08; C22B 21/0007; C22B 21/0069; C22B 7/001; C22B 7/003; C22B 9/16; C22B 21/00
(Continued)

(56) References Cited

U.S. PATENT DOCUMENTS 2,302,980 A    11/1942  Stern
2,391,752 A *  12/1945  Stern .................... C22C 1/0416
                                                 72/271
(Continued)

FOREIGN PATENT DOCUMENTS

AU    2001281596 B2    9/2005
DE       2613793 A1   10/1976
(Continued)

*Primary Examiner* — Jessee R Roe
*Assistant Examiner* — Michael Aboagye
(74) *Attorney, Agent, or Firm* — Harness, Dickey & Pierce, P.L.C.

(57) ABSTRACT

The disclosure relates to a method for producing feedstock in piece form from metal, in particular aluminium and/or aluminium alloys, for a metal-casting installation, in particular aluminium-casting installation, in which scrap parts of metal, in particular of aluminium and/or aluminium alloys, are sorted on the basis of their alloying constituents and/or alloy contents and subsequently, on the basis of an alloy to be produced in the feedstock, the scrap parts are mixed into a composition having a homogeneous distribution of the alloy and fed to a press, in which the scrap parts of the composition are subjected to a pressure that compresses the scrap parts while generating a temperature, wherein, as a result of the application of pressure, the scrap parts are heated up to the transition temperature between solid and liquid of at least some of the scrap parts and/or the alloys and/or alloying constituents thereof before the feedstock is discharged in a specific geometrical form.

13 Claims, 1 Drawing Sheet

(51) Int. Cl.
    *C22B 7/00*     (2006.01)
    *B02C 23/08*     (2006.01)
    *C22C 21/00*     (2006.01)

(58) Field of Classification Search
    USPC ...... 241/24.13, 24.1, 24.14, 24.25; 266/901; 75/403
    See application file for complete search history.

(56) References Cited

U.S. PATENT DOCUMENTS

| | | | | |
|---|---|---|---|---|
| 3,626,578 A | * | 12/1971 | Price et al. | B21C 23/01 419/48 |
| 4,028,795 A | * | 6/1977 | Takahashi | C22C 1/0416 419/48 |
| 4,033,024 A | * | 7/1977 | Takahashi | B21C 23/01 29/403.2 |
| 4,050,142 A | * | 9/1977 | Takahashi | B22F 8/00 419/48 |
| 4,173,061 A | * | 11/1979 | Shimizu | B21C 23/01 29/403.2 |
| 9,339,867 B2 | | 5/2016 | Bultermann | |
| 9,802,246 B2 | | 10/2017 | Bultermann | |
| 9,956,609 B1 | * | 5/2018 | De Saro | B22D 47/00 |
| 2014/0311698 A1 | | 10/2014 | Bultermann | |
| 2016/0221074 A1 | | 8/2016 | Bultermann | |

FOREIGN PATENT DOCUMENTS

| | | |
|---|---|---|
| DE | 102011103294 A1 | 11/2012 |
| DE | 102016108116 A1 | 11/2017 |
| EP | 2086697 B1 | 5/2013 |
| EP | 2776189 A1 | 9/2014 |
| EP | 2862950 B1 | 3/2017 |
| GB | 569984 A | 6/1945 |

* cited by examiner

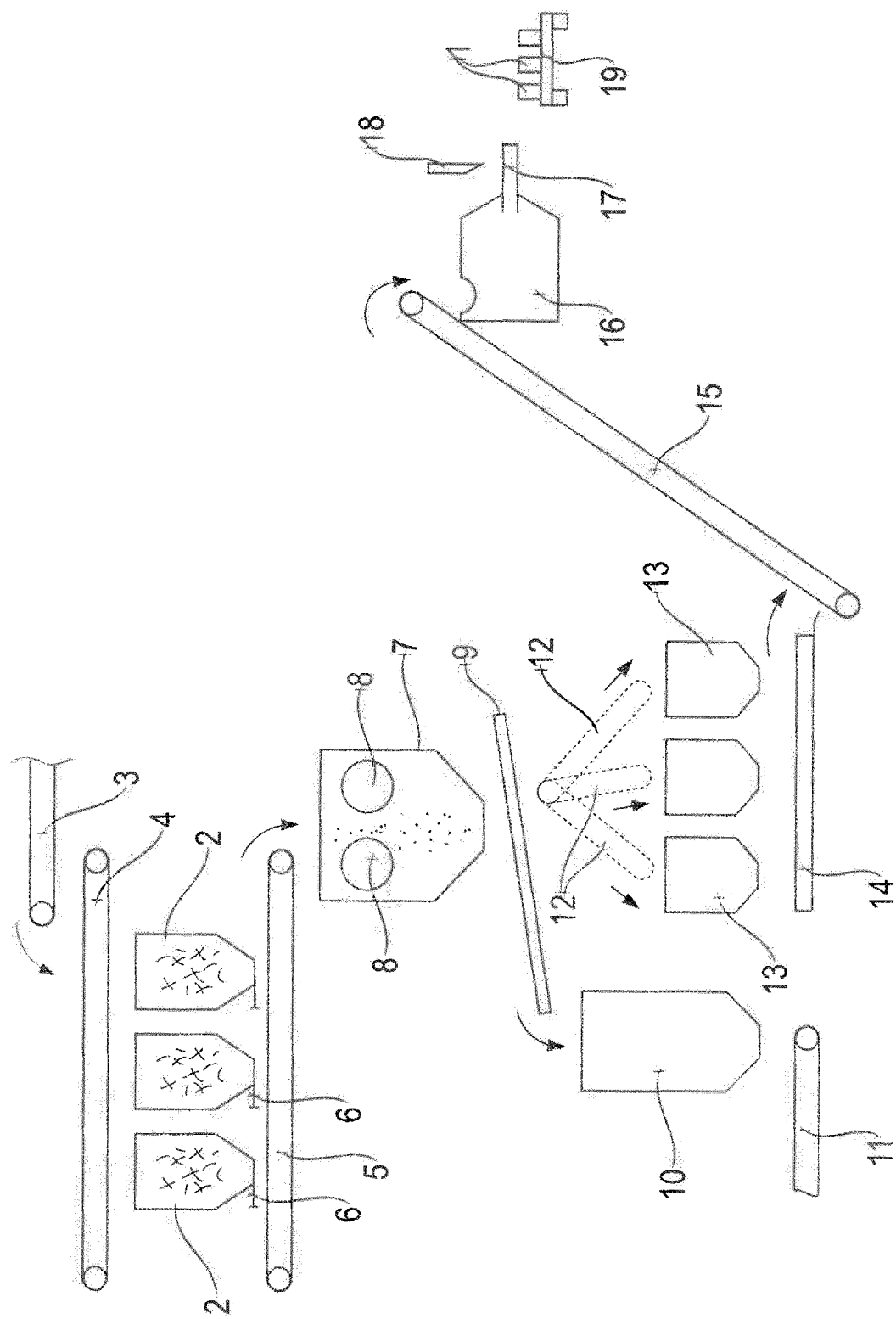

METHOD AND DEVICE FOR PRODUCING FEEDSTOCK IN PIECE FORM FROM METAL

CROSS-REFERENCE TO RELATED APPLICATIONS

This application is a National Phase of International Application No. PCT/EP2018/058684 filed on Apr. 5, 2018, which claims the benefit of German Patent Application No. 10 2017 114 012.3, filed on Jun. 23, 2017. The entire disclosures of the above applications are incorporated herein by reference.

FIELD

The disclosure relates to a method and a device for producing feedstock in piece form made from metal, in particular aluminium and/or aluminium alloys, for a metal casting installation, in particular aluminium-casting installation.

BACKGROUND

This section provides background information related to the present disclosure which is not necessarily prior art.

For producing construction elements made of metal, in particular aluminium and aluminium alloys, feedstock in piece form made from metal, in particular aluminium and/or aluminium alloys, will be fused. This feedstock is produced from scrap parts, wherein these scrap parts can be recycling material. These scrap parts also include chips or metal dust which are/is produced during the machining of a metal block, in particular an aluminium block. One can also subsume under scrap parts the press remnants which are produced during the punching of for example aluminium plates for the manufacture of a vehicle body. In particular in the processing of aluminium a high percentage of the originally used aluminium quantity accumulates as scrap parts, namely waste materials, during the production.

These scrap parts made of aluminium are sorted out into fractions of a relatively homogenous chemical composition, especially alloy. Principally, the geometry of the scrap parts only has a minor importance here. The alloy to be obtained in the feedstock, which can be for example block or bar material to be fed into a melting furnace, is of far greater importance. In order to obtain the required alloy to be obtained in the feedstock, it is therefore known to arrange a fraction of different scrap parts, such that a molten mass having the required alloy of the feedstock will be produced in the following melting process. The supply of the scrap parts to the melting furnace takes in particular place according to melting aspects, such that for example comparatively light fractions are the first ones to be supplied to the melting furnace, whereas comparatively heavy fractions are arranged on the light fractions in order to cover these ones, which counteracts the swimming up of the comparatively light fractions. Light fractions in this sense can be for example chips or dust.

Due to the melting of the different scrap parts, a homogenization with respect to the alloy or the chemical composition is achieved. The molten metal will then be casted into homogenized metal blanks. These ones are a primary product of the feedstock in piece form which can in the following be molten by the manufacturers of metal components, such as for example motor blocks, and be casted into the corresponding form.

However, previously the metal blanks are supplied to a casting operation in a second step. In this casting furnace a charge make-up will take place. The charge make-up is to be understood as an operation in which alloying elements are added to the molten metal blanks, such that the target chemistry or the intended alloy will be achieved in a desirable manner. The molten mass leaving the melting furnace will then be casted into moulded articles, namely the feedstock in piece form, which will be packaged after cooling down and be delivered to the customer, namely the manufacturer of corresponding metal parts, for further processing. Here it is also often referred to so-called ingots, which are bar-shaped elements.

In particular in the at last described step of fusing in the casting furnace the molten mass absorbs oxygen and hydrogen from the environment. This negatively affects the desired target chemistry. For this reason it is also required that the feedstock has to be newly molten by the user or manufacturer of metal components, such that oxygen and hydrogen can be removed. Furthermore, this also enables an additional refinement of the alloy by the user of the feedstock. This one can be for example a manufacturer of motor blocks for the automobile industry.

This previously known method has the disadvantage that an extremely high energy demand is required for the two melting processes before the manufacture of the feedstock. Furthermore, herein exhaust gases are produced to a considerable extent, such that filter systems have to be used. These filter systems are subject to wear and have thus to be serviced regularly and to be replaced in intervals. The plant engineering for fusing metal is furthermore related to very high investment costs. It is furthermore disadvantageous that corresponding plants as well as the operation thereof are subject to authorization and will not be approved in every area. This in turn means that corresponding plants usually are placed at a great spatial distance from the user of the feedstock, such that high costs have to be expected both for the transport of the feedstock to the user and for the transport of the scrap parts to the plant.

From EP 2 862 950 B1 a method for the mechanical processing of aluminum scrap is for example known. In this method the aluminum scrap is crushed in a first step, in a second step the crushed aluminum scrap is supplied to a screening plant and divided into a fraction of undersize grain materials, on the one hand, and a fraction of oversize grain materials, on the other hand. In a third step the fraction of oversize grain materials is homogenized, before in a fourth step the homogenized fraction of oversize grain materials is subjected as material to be sorted to a density determination in an x-ray device by means of x-ray transmission. Afterwards material particles of the material to be sorted which have a density above a pre-determinable limiting value are pneumatically sorted out in a fifth step.

The thus obtained fraction of aluminum scrap having a certain particle size is then suitable to be supplied to a smelting plant, in order to produce from this a molten mass having a certain alloy and thus chemical composition.

Furthermore, a screw extruder for continuously extruding materials with high viscosity, in particular metal, such as for example aluminium and the alloys thereof, is known from EP 2 086 697 B1, which screw extruder comprises an Archimedian screw which is arranged in a rotatable manner inside a lining of a screw housing having an inlet for supplying the material which shall be extruded, an extrusion chamber and an extrusion tool assembly comprising a forming tool, which forms the shape of the desired extruded product. The screw and the lining of this screw extruder are configured, such that the required compression will take place at the downstream end of the screw towards the extrusion chamber corresponding to up to 540° of the rotation of the screw or up to 1.5 rotations of the helical mount length. Furthermore it is provided that the compressed metal that is formed in the compression zone and the massive metal plug in the extrusion chamber are excluded from a rigid rotation, whereby the required compression and extrusion pressure will be obtained.

SUMMARY

This section provides a general summary of the disclosure, and is not a comprehensive disclosure of its full scope or all of its features.

Based upon this state of the art it is the object of the disclosure to improve a generic method or a generic device such that scrap parts made of metal can be processed in a simple and thus clearly cost-efficient manner to form a feedstock for smelting processes, wherein a corresponding device or a corresponding method can be operated independently from the location, and furthermore feedstock comprising an alloy to be produced and a homogenous alloy distribution can be produced.

In the method according to the disclosure it is provided that scrap parts made of metal, in particular aluminium and/or aluminium alloys, will be sorted according to the alloy components and/or alloy contents thereof and afterwards the scrap parts will be mixed, based upon an alloy to be produced in the feedstock, to form a composition comprising a homogenous alloy distribution and will be supplied to a press, in which a pressure is applied to the scrap parts of the composition, which pressure compacts the scrap parts while generating a temperature, wherein due to the pressure application the scrap parts will be heated up to the transition temperature between solid and liquid of at least a part of the scrap parts and/or the alloys and/or the alloy components thereof, before the feedstock having a particular geometric form is output.

Therefore, based upon the scrap parts, at first a composition will be produced in the method according to the disclosure. This composition shall comprise a homogenous alloy distribution, For this purpose, different scrap parts will be combined and mixed according to the analysis of the alloy or alloy composition thereof and corresponding to the feedstock to be produced. This composition will then be supplied to a press, in which a pressure will be applied to the scrap parts of the composition. Herein, the scrap parts will be compressed while generating a temperature. Due to the pressure application the scrap parts will be heated up to the transition temperature between solid and liquid of at least a part of the scrap parts and/or the alloys and/or the alloy components thereof. On the threshold of the transition temperature between solid and liquid the so-called thixotropic state is achieved. This one is, inter alia, characterized by the fact that the viscosity of the material, i.e. the scrap parts and/or the alloys and/or the alloy components thereof, is reduced under the effect of gravities. Thus, a modelling state is obtained which enables to very precisely form the material and/or to press it into shapes. It is particularly advantageous in this context that due to the thixotropic melting, the future feedstock will comprise a very homogenous distribution of the alloy components.

The execution of the process according to the disclosure overall enables, only by means of pre-sorting, mixing and mechanical pressure application, to produce feedstock pieces which comprise a desired geometric configuration, on the one hand, and a homogenously distributed alloy composition, on the other hand.

The thixotropic melting, i.e. the heating up of the scrap parts to the transition temperature between solid and liquid due to the pressure application is preferred, but it can also be alternatively provided to heat up the scrap parts to the melting point of at least a part of the scrap parts and/or the alloys and/or the alloy components thereof by means of the pressure application. According to this process variant the scrap parts are at least partially fused to such an extent that it becomes possible to assemble the scrap parts together. Herein, individual alloy components can for example play the role of a binding agent, as far as these ones fuse due to the temperature during the compression and afterwards harden again while connecting other scrap parts. This operation only takes place after the scrap parts have been formed into a particular geometric shape, which corresponds to the desired feedstock, for example a bar-shaped material.

This feedstock is then suitable to be supplied in the following to a metal casting plant, in particular an aluminium casting plant, in order to produce construction parts from this, such as blocks for the manufacture of motor blocks, but also aluminium plates which will be cold-formed and processed, for example punched out, in another production step.

It has proved to be advantageous for bigger scrap parts to crush the scrap parts before sorting. In particular in the case of residuals from punching out processes the scrap parts can be of such a kind that they cannot be supplied to a method according to the disclosure without previous crushing. Thanks to the crushing, also particles having a particular composition will be surely found, in order to be able to sort them out, wherein the physical parameter of the density can be used as sorting out criterion, which is characteristic with respect to possible material components and/or compositions. Herein, the process step of crushing can be carried out in several steps. A two-step crushing is preferred, wherein in the first crushing step for example a shredder or a rotor mill will be used. The particles which leave the shredder or the rotor mill have a cubic or sphere-like design and may have a size of up to 200 mm.

In a second crushing step, the previously shredded scrap parts will enter a downstream post-crushing device or a granulator. Here, a post-crushing will take place, wherein the particles which leave the post-crushing device or the granulator will be surface-shaped or disk-shaped and comprise a size of for example up to 80 mm. Another process step can be provided following the crushing step, in which further process step the crushed scrap parts are supplied to a screening plant, in order to separate the scrap parts into two material grain sizes, wherein two fractions will be formed, namely a fraction of undersize grain materials, on the one hand, and a fraction of oversize grain materials, on the other hand. Depending on the used screens, the size of the oversize grain materials or the undersize grain materials will be defined. The oversize grain material for example comprises a size of more than 0.3 mm, more preferably of more than 3 mm and most preferably of more than 10 mm. Grains having a smaller grain size belong to the undersize grain material.

According to another aspect of the disclosure it is provided that before the crushing the scrap parts are combined according to the alloy to be produced in the feedstock and are supplied to a crushing device. Then, in a further step the crushed scrap parts will be post-sorted with respect to their chemical composition. This means that fractions having uniform alloys are created. These fractions can in turn be stored temporarily in bins.

It is provided in the method according to the disclosure that for obtaining the chemical composition to be achieved in the feedstock, for example the ingots, pre-calculated quantities of pre-determined fractions of different scrap parts will be mixed with each other into a homogenous mixture. According to the desired target chemistry or the required alloy of the feedstock, corresponding fractions will be combined and mixed with each other according to their compositions, on the one hand, and their respective quantities, on the other hand, such that a homogenous distribution within the mixed fraction, namely the composition will be generated.

According to another feature of the disclosure it is provided that the homogenous composition is supplied to an extruder. In this extruder the preferably crushed scrap parts will be subjected to a pressure, at which a temperature is generated, which entails a thixotropic melting of at least a part of the scrap parts and/or the alloys and/or the alloy components thereof. The result of the application of pressure in the extruder is that the scrap parts are heated up to the transition temperature between solid and liquid, which consequently leads to a reduced viscosity of the material of the scrap parts heated to such an extent, which causes a modelling state. This allows outputting a feedstock with a certain geometric shape, in particular in form of an extruded rope material, at the exit of the extruder.

In this context in particular the use of a screw extruder is preferred. Alternatively, also a piston extruder can be used as extruder. In comparison to the piston extruder, however, the screw extruder has got the advantage that it is possible to continuously execute the process, such that if scrap parts are continuously provided, both a continuous processing of the scrap parts by sorting, crushing and mixing and a continuous production of feedstock by supplying processed scrap parts to the extruder and a temperature generation there by pressure application will be possible. In comparison to a piston extruder the screw extruder has furthermore got the advantage that it can be operated with less wear and in a more energy efficient manner.

The individual fractions of the scrap parts comprising a known composition, in particular alloy, will be taken out of a stocking device as required for the alloy to be produced in the feedstock and will be supplied to a mixing device. Herein, the scrap parts taken out of the stocking device will be weighed in the required weight proportions according to the alloy compositions thereof and supplied to the mixing device according to a predetermined composition. For this purpose, individual weighing devices are preferably provided in the area of the stocking device, which weighing devices serve for weighing individual fractions of the scrap parts before these ones are supplied together with other fractions to the mixing device.

The batch that is thus composed of scrap parts comprising different alloys is supplied to the pressing operation after the mixing operation, and this preferably in a continuous manner. Herein, the continuous supply to the pressing device comes in particular in question, if a continuously operating screw extruder is used as pressing device, such that a continuous production of feedstock is enabled.

The batch of scrap parts, which is supplied to the extruder preferably configured as screw extruder, is heated up due to the compression and the thereby generated friction forces, and this up to a temperature which corresponds to the transition temperature between solid and liquid of at least a part of the scrap parts. Thus, a quasi substance-to-substance bonded compound of the supplied scrap parts is formed, which scrap parts comprise fluid characteristics at the threshold of the transition temperature between solid and liquid in the so-called thixotropic state, which allows a precise moulding. For the purpose of moulding the extruder comprises a matrix on the side of the output and/or a matrix is arranged downstream the extruder, which matrix serves for moulding the pressed parts into a continuous rope, for example with a rectangular or circular cross section.

According to another feature of the disclosure the feedstock is output as a continuous rope material and cut to length according to needs. In particular in case of a rope material comprising a rectangular cross section, ingot-shaped elements are thus formed which can be easily stacked. A stack of such ingots that is for example arranged on a pallet is ready for dispatch and can be delivered to the user, for example by truck and/or by rail.

It has to be noted that due to the omitted melting operation of the scrap parts an oxidation layer can have formed on the surface of these scrap parts. In view of the further processing, during which the feedstock is supplied to a melting process, this disadvantage is however not relevant, since during the processing of the feedstock oxygen and hydrogen can be driven out in the course of the melting operation, such that possibly present oxidation material on the feedstock is not of importance.

Furthermore, in spite of the omitted melting process and the related disadvantages of an incomplete homogeneity of the feedstock, the method according to the disclosure has the advantage that due to the production of the feedstock in a particular geometric shape, for example in form of ingots or other ingot-like elements, these ones will be produced from a rope material, such that an increased homogeneity is achieved in that a batch of feedstock is produced from a batch of combined scrap parts, such that in turn a high homogeneity of the feedstock over the entire batch of the feedstock results.

The feedstock, which is formed without previous melting of the scrap parts, is thus especially suitable for a usual processing in the production of construction parts for example made of aluminium. The essential advantage of the disclosure is, inter alia, the clearly lower energy demand required for the production of the feedstock. In the method according to the disclosure only energy for the pressing has to be provided and neither energy for a thermal treatment nor filter systems for purifying potential exhaust gases are required. The result of this is also that a device according to the disclosure for producing feedstock in piece form made from metal, in particular aluminium and/or aluminium alloys, causes clearly lower investment costs. As exhaust gases are avoided and a lower energy demand is required, corresponding devices are also easier to handle with respect to the approval of their construction and their use, such that corresponding devices can be built up and operated at clearly more sites. According to another feature of the disclosure it can be for example provided that metal parts, such as chips, dust, melting residuals from the production of metal parts, such as in particular the production of aluminium cast parts, aluminium punched parts or the like, in particular from the use of the feedstock, are used as scrap parts. Regarding this design it has proved to be advantageous that a corresponding device can be used directly in the area of the melting plant, such that also the transport of the feedstock to the processor or the transport of scrap parts to the producer of the feedstock can be clearly reduced, if not totally avoided. Such a procedure comes into question, if corresponding scrap parts are produced in the company of the manufacturer, i.e. the user of the feedstock, which scrap parts can then be at once pressed into new feedstock without additional transport costs and with the same alloys and can then be further processed in the plant of the manufacturer. Herein, it has to be considered that for example during the production of aluminium end products mill chippings are generated which partly correspond to 90% of the used total amount of the aluminium. These chippings can be processed directly after their generation in the described method. A contamination of these chippings is harmless, since the feedstock will be molten in the following process, such that foreign substances can be driven out.

The above described method is preferably carried out by means of a device which comprises a storing device comprising several storing areas for scrap parts made of metal, in particular aluminium and/or aluminium alloys, in which storing device the scrap parts can be stocked according to their alloy components and/or alloy contents. Furthermore, the device according to the disclosure comprises a mixing device, in which the scrap parts taken out of the storing areas in a predetermined proportion are mixed to form a composition comprising a homogenous alloy distribution for obtaining an alloy to be produced in the feedstock. Finally, a pressing device is provided to which the composition is supplied and in which the composition is compressed by a pressure while generating a temperature, wherein the scrap parts will be heated up to the transition temperature between solid and liquid of at least a part of the scrap parts and/or the alloys and/or the alloy components thereof by means of the pressure application, before the feedstock is output in a particular geometric shape.

In addition a crushing device can be provided which is arranged downstream of the storing device. In this case, the required quantity and/or quality of the scrap parts will be taken out of the storing device and supplied to the crushing device, in order to crush the scrap parts to a size which allows supplying the scrap parts to the pressing device. It is for example possible to separate too big parts in a preceding step, for example in a sieve device.

According to the device according to the disclosure it can be provided in addition that a mixing device is arranged upstream of the pressing device, to which mixing device individual fractions of the scrap parts comprising a known composition, especially alloy, which have been taken out of the storing device, will be supplied in proportions required for the alloy to be produced in the feedstock. It has proved useful with respect to the mixing device to arrange this one downstream of the crushing device, since it is easier to obtain a higher homogeneity of the composition on the base of crushed scrap parts.

According to another feature of the disclosure it is finally provided that a cutting device is arranged downstream of the pressing device, by means of which cutting device the feedstock output as continuous rope material will be cut to length according to needs.

Further areas of applicability will become apparent from the description provided herein. The description and specific examples in this summary are intended for purposes of illustration only and are not intended to limit the scope of the present disclosure.

DRAWINGS

The drawing described herein are for illustrative purposes only of selected embodiments and not all possible implementations, and are not intended to limit the scope of the present disclosure.

Other features and advantages of the disclosure will become apparent from the following description of the associated drawing in which a preferred embodiment of a device according to the disclosure is represented.

According to another feature of the disclosure it is provided that a measuring device is arranged downstream of the pressing device. This measuring device can be arranged upstream or downstream of the optionally provided cutting device. The measuring device serves to metrologically gather the rope material coming out of the pressing device. Such a metrological gathering can be for example realized by a chemical analysis. The advantage of this embodiment is that the rope material can be examined with respect to a quality that should be desirably obtained, in particular with respect to an alloy composition that should be desirably obtained, directly after leaving the pressing device. A device for the optical emission spectroscopy can be for example used as measuring device in this sense.

A device for producing feedstock 1 in piece form made from metal, namely aluminium or an aluminium alloy is represented in the only FIG. 1.

The feedstock 1 is provided for an aluminium casting plant, in which a molten mass is produced from the feedstock 1, which molten mass will then be cast in a mould and taken out of the mould after having cooled down.

Corresponding reference numerals indicate corresponding parts throughout the several views of the drawing.

DETAILED DESCRIPTION

Example embodiments will now be described more fully with reference to the accompanying drawing.

The device comprises several storing areas 2 in which scrap parts made of aluminium or aluminium alloys comprising different configurations with respect to the composition and/or the geometric form and/or the size are stored. A continuous conveyor 3 is arranged above the storing areas 2, which continuous conveyor 3 comprises a displaceable continuous conveyor 4, the position of which with respect to the continuous conveyor 3 can be adjusted, such that the individual storing areas 2 can be filled with scrap parts via the continuous conveyor 3 and the continuous conveyor 4.

Another continuous conveyor 5 is arranged beneath the storing areas 2. Each storing area 2 comprises a safety slide 6 on the side of the exit. The safety slides 6 of the storing areas 2 can be opened and closed via a no further represented control, wherein a certain quantity of the different scrap parts stored in the individual storing areas 2 will be transferred onto the continuous conveyor 5 during the opening period.

In addition, a no further represented weighing device can be provided, which is placed between the safety slide 6 and the continuous conveyor 5, such that the quantity of scrap parts comprising a particular composition, i.e. alloy, which is to be transferred onto the continuous conveyor 5 will be weighed, in order to be united with scrap parts from the other storing areas 2, such that the scrap parts conveyed by the continuous conveyor 5 will form a feedstock which comprises a predetermined alloy.

The continuous conveyor 5 transports the scrap parts from the storing areas 2 into a crushing device 7, which comprises two rotating rollers 8 with rabbet ledges that are optionally arranged on these ones. The distance between the rollers 8 or the rabbet ledges that are arranged thereon, but are not represented can be adjusted, such that scrap parts having a particular geometric design and size can be produced by means of the crushing device 7. The scrap parts that pass through the crushing device 7 get then on a sieve device 9 arranged beneath the crushing device 7, which sieve device 9 separates the crushed scrap parts into at least two size fractions, namely into a so-called undersize grain material which passes through the sieve device 9 and an oversize grain material that does not pass through the sieve device 9 and is supplied by the sieve device 9 to a storage container 10. The oversize grain material can be removed by a continuous conveyor 11 from this storage container 10 and for example be transferred onto the continuous conveyor 3 for a new supply to the storing area 2.

The undersize grain material, which passes through the sieve device 9, can be supplied to different bins 13 via a pivoting chute 12, in which bins the undersize grain material of the scrap parts is stored. Herein, different qualities of the scrap parts, namely with respect to their alloy composition and/or with respect to the quantities of the alloy components, are stored in the individual bins 13.

Different fractions of the scrap parts can thus be taken out of the bins 13 and be supplied to a mixing device 14. Such a mixing device 14 can be for example a shaking tub. But it is also possible that such a mixing device 14 comprises mixing tools, such as for example screws which serve to homogenize the different fractions of scrap parts from the bins 13 in the mixing device 14.

As soon as the mixing operation in the mixing device 14 is completed, the mixing device 14 transfers the composition of different batches of scrap parts to another continuous conveyor 15 which supplies the composition of scrap parts to a pressing device 16, namely a screw extruder. The supply takes place in a dosed manner such that the pressing device 16 is constantly filled with a predetermined quantity of scrap parts. Preferably, the supply to the screw extruder is realized in a continuous manner, but at least in such a way that rope material 17 can be continuously output of the exit of the screw extruder.

The supplied scrap parts are compressed in the screw extruder and thus heated up to a temperature, which corresponds to the transition temperature between solid and liquid of at least a part of the scrap parts. On the threshold of the transition temperature the so-called thixotropic state of the heated scrap parts is achieved, which causes a fluidity due to a reduced viscosity. The thus heated scrap parts are pressed through the matrix belonging to the extruder on the end side, such that a continuous output of rope material 17 is obtained. Afterwards, the rope material 17 is cut to length according to the needs by means of a cutting device 18 and then stacked as feedstock 1 on for example a pallet 19.

The use of an extruder is preferable for extruding material having a high viscosity, such as for example aluminium. For this purpose, a special configuration of the extruder screw in combination with a special configuration of the extrusion chamber is provided, in order to limit the rotating flow of the metal. Thanks to this configuration the required compression and extrusion pressure is obtained. During the extrusion of aluminium scrap this one reaches a temperature in the extruder, at which the aluminium scrap sticks together, but also adheres to the walling of the extruder or of the extruder screw. In the following the aluminium scrap will be kneaded and thus reaches a higher temperature, wherein then a plug made of solid material will be formed at the end of the extruder screw, which material will be pushed by following material into an extrusion chamber. The aluminium scrap then leaves the extrusion chamber as continuous rope material and can be cut to length in the form of needs-based feedstock 1, for example in the form of ingots.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for producing feedstock in piece form made from metal for a metal casting installation, in which method scrap parts made of metal are sorted according to alloy components and/or alloy contents thereof and afterwards the scrap parts are mixed, based upon an alloy to be produced in the feedstock, to form a composition comprising a homogenous alloy distribution and supplied to an extruder in which a pressure is applied to the scrap parts of the composition, which pressure compacts the scrap parts and generates an increase in temperature, wherein the pressure application is of a magnitude such that the scrap parts are heated up to a temperature that corresponds to a melting point of at least a part of the scrap parts and/or the alloy contents and/or the alloy components thereof without an external heat application, before the feedstock having a particular geometric form is output from the extruder.

2. The method according to claim 1 wherein the scrap parts are crushed before being sorted.

3. The method according to claim 2, wherein before the crushing the scrap parts are combined according to the alloy to be produced in the feedstock and supplied to a crushing device.

4. The method according to claim 1, wherein individual fractions of the scrap parts comprising a known composition are taken out of a stocking device as required for the alloy to be produced in the feedstock and are supplied to a mixing device.

5. The method according to claim 1, wherein the feedstock is output as a continuous rope material and cut to length according to needs.

6. The method according to claim 1, wherein metal parts including chips, dust, and melting residuals from the production of metal parts will be used as scrap parts.

7. A device for producing feedstock in piece form made from metal according to the method of claim 1, comprising a storing device comprising several storing areas for storing scrap parts made of metal sorted according to their alloy components and/or alloy contents, a mixing device, in which the scrap parts taken out of the storing areas in a predetermined proportion are mixed to form a composition comprising a homogenous alloy distribution for obtaining an alloy to be produced in the feedstock, and the extruder.

8. The device according to claim 7, wherein a crushing device is arranged downstream of the storing device.

9. The device according to claim 7, wherein the extruder is configured as a screw extruder.

10. The device according to claim 7, wherein the extruder is configured as a piston extruder.

11. The device according to claim 7, wherein the mixing device is arranged upstream of the extruder, wherein individual fractions of the scrap parts taken out of the storage device and comprising a known composition as required for the alloy to be produced in the feedstock are supplied to the mixing device.

12. The device according to claim 7, wherein a cutting device is arranged downstream of the extruder, by means of which cutting device the feedstock output as continuous rope material is cut to length according to needs.

13. The device according to claim 7, wherein a measuring device is arranged downstream of the extruder.

* * * * *